United States Patent [19]

El Bouhnini et al.

[11] 4,242,406
[45] Dec. 30, 1980

[54] FIBER REINFORCED COMPOSITE STRUCTURAL LAMINATE COMPOSED OF TWO LAYERS TIED TO ONE ANOTHER BY EMBEDDED FIBERS BRIDGING BOTH LAYERS

[75] Inventors: Larbi El Bouhnini, Hanover Park; Thomas J. Fitzpatrick, Libertyville, both of Ill.; Donald M. Harwick, Pittsburgh, Pa.; Robert M. Hoffman, Palos Heights; Wayne M. Knoll, Wheaton, both of Ill.

[73] Assignees: PPG Industries, Inc., Pittsburgh, Pa.; United States Gypsum Company, Chicago, Ill.

[21] Appl. No.: 34,695

[22] Filed: Apr. 30, 1979

[51] Int. Cl.³ .......................... B28B 1/32; B29C 5/02; B32B 13/02; B32B 13/12; B32B 13/14; E04C 2/26

[52] U.S. Cl. .................................. 428/236; 52/309.13; 52/309.14; 52/309.15; 52/454; 52/612; 156/39; 156/42; 156/44; 264/171; 264/258; 264/309; 264/337; 428/246; 428/268; 428/272; 428/284; 428/285; 428/286; 428/287; 428/302; 428/414; 428/415; 428/417; 428/431; 428/432; 428/482; 428/483; 428/500; 428/521

[58] Field of Search ............... 264/171, 258, 309, 337; 52/309.13, 309.14, 309.15, 454, 612; 156/39, 42, 44; 428/236, 246, 268, 284, 285, 272, 286, 287, 414, 302, 415, 417, 431, 432, 482, 483, 500, 521

[56] References Cited

U.S. PATENT DOCUMENTS

| | | | |
|---|---|---|---|
| 858,675 | 7/1907 | Schneider | 52/676 |
| 2,760,881 | 8/1956 | Toalmin | 52/309.13 |
| 2,817,224 | 1/1940 | Cory | 72/130 |
| 2,850,890 | 9/1958 | Rubenstein | 72/36 |
| 3,250,640 | 5/1966 | Varlet | 427/340 |
| 3,289,371 | 12/1966 | Pearson et al. | 52/338 |
| 3,340,083 | 9/1967 | Wilson | 427/375 |
| 3,350,257 | 10/1967 | Hourigan et al. | 52/309.15 |
| 3,462,339 | 8/1969 | Poms | 428/920 |
| 3,538,213 | 11/1970 | Robert | 264/309 |
| 3,538,664 | 11/1970 | Frandsen et al. | 52/309.13 |
| 3,622,656 | 11/1971 | Dewey | 264/309 |
| 3,736,715 | 6/1973 | Krumwiede | 52/309.13 |
| 3,742,985 | 7/1973 | Rubenstein | 138/141 |
| 3,763,614 | 10/1973 | Hyde et al. | 52/309.13 |
| 3,830,687 | 8/1974 | Re et al. | 52/309.13 |
| 3,868,290 | 2/1975 | McKeon et al. | 52/612 |
| 4,018,963 | 4/1977 | Fuji et al. | 428/294 |
| 4,018,964 | 4/1977 | Otouma et al. | 428/372 |
| 4,075,364 | 2/1978 | Panzerra | 427/423 |
| 4,187,275 | 2/1980 | Bracalielly | 156/44 |

*Primary Examiner*—James C. Cannon
*Attorney, Agent, or Firm*—Jones, Tullar & Cooper

[57] ABSTRACT

This invention relates to a structural laminate having a plastic surface finish coat laminated to a structural base which has exceptional bond strength between the structural base and the plastic layer with which it interfaces. The structural base comprises a glass reinforced gypsum layer. The plastic laminate portion comprises a plastic surface finish coat, preferably a polyester gel coat or an acrylic resin, bonded to a reinforcing layer of curable polyester or epoxy resin reinforced with glass fibers. The reinforcing layer is adhered to a bonding layer which comprises glass fibers protruding from the reinforcing layer and coated with a limited amount of organic resin such as polyester or epoxy resin. The glass reinforced gypsum layer is applied to the protruding fibers of the bonding layer to form an interface having a bond strength of at least about 150 psi as determined by ASTM C297-68.

10 Claims, 1 Drawing Figure

FIBER REINFORCED COMPOSITE STRUCTURAL LAMINATE COMPOSED OF TWO LAYERS TIED TO ONE ANOTHER BY EMBEDDED FIBERS BRIDGING BOTH LAYERS

BACKGROUND OF THE INVENTION

1. Field of the Invention

This invention pertains to a structural laminate having a plastic surface finish coat laminated to a structural base, which is useful in manufacturing wall units, building panels, furniture, cabinets, and plumbing ware. Useful items which may be manufactured by the practice of this invention include shower stalls, tubs and sinks.

2. Description of the Prior Art

Fiber glass reinforced materials are used in making structural panels and shaped articles. The large quantities of organic resin necessary for structural integrity of such articles renders them costly to produce. One proposed solution employs inorganic materials such as gypsum as a substitute for the costly resin used in the structural base. The inorganic materials used in the structural base should have adequate physical properties and a good bond to the plastic surface finish to provide structural integrity to the laminated product. The plastic surface finish is preferably a polyester gel coat or acrylic resin which provide water and stain resistance, colorfastness, durability and cleanability.

U.S. Pat. No. 3,868,296, to McKeon, Jr., et al teaches a plaster structural unit with a water impervious face, an intermediate layer of fiber glass reinforced resin, a second intermediate layer of organic resin mixed with protruding wood chips, and a backing layer of gypsum. The wood chips and the second intermediate layer protrude from the resin to engage the gypsum layer bonding it to the laminate. The chips have relatively low tensile strength and are bulky, on the order of one-fourth to one-half inch wide, so that the layer containing the chips must inherently be relatively thick, from 0.2 to 0.5 inches.

SUMMARY OF THE INVENTION

Briefly, the present invention comprises a multi-layer, fiber glass reinforced laminate having organic and inorganic layers and a process for making said laminate.

The first layer is an organic resin gel coat which is bonded to a second layer (reinforcing layer) of organic resin and reinforcing glass fibers. A third layer (bonding layer) comprises glass fibers sprayed onto the reinforcing layer and having a coating of organic resin applied to said glass fibers. The glass fibers of the bonding layer protrude therefrom and serve as means to engage a layer of glass fiber reinforced gypsum which is the fourth layer of the laminate product.

The organic resin gel coat may be applied to the surface of a mold, followed by the application of the glass fiber reinforced organic resin layer. The reinforcing layer is then rolled or otherwise compressed to densify it and remove entrapped air. The glass fibers of the bonding layer are dry sprayed onto the reinforcing layer while the reinforcing layer is still tacky. A small amount of organic resin is then misted onto the surface of the glass fibers of the bonding layer to promote adhesion of the fibers to each other and to the reinforcing layer. A layer of glass fiber reinforced gypsum is applied to the bonding layer, and the gypsum intimately surrounds the glass fibers of the bonding layer which protrude therefrom in random directions. The protruding fibers of the bonding layer mechanically engage the gypsum layer and provide adhesion between the gypsum layer and the organic resin layers. The laminate is strong and light weight and utilizes a minimum of the relatively expensive organic resin.

BRIEF DESCRIPTION OF THE DRAWINGS

The sole drawing represents a schematic sectional view of the laminate product of the invention showing the various layers and their relationships to one another.

DESCRIPTION OF THE PREFERRED EMBODIMENT

Figure 1:
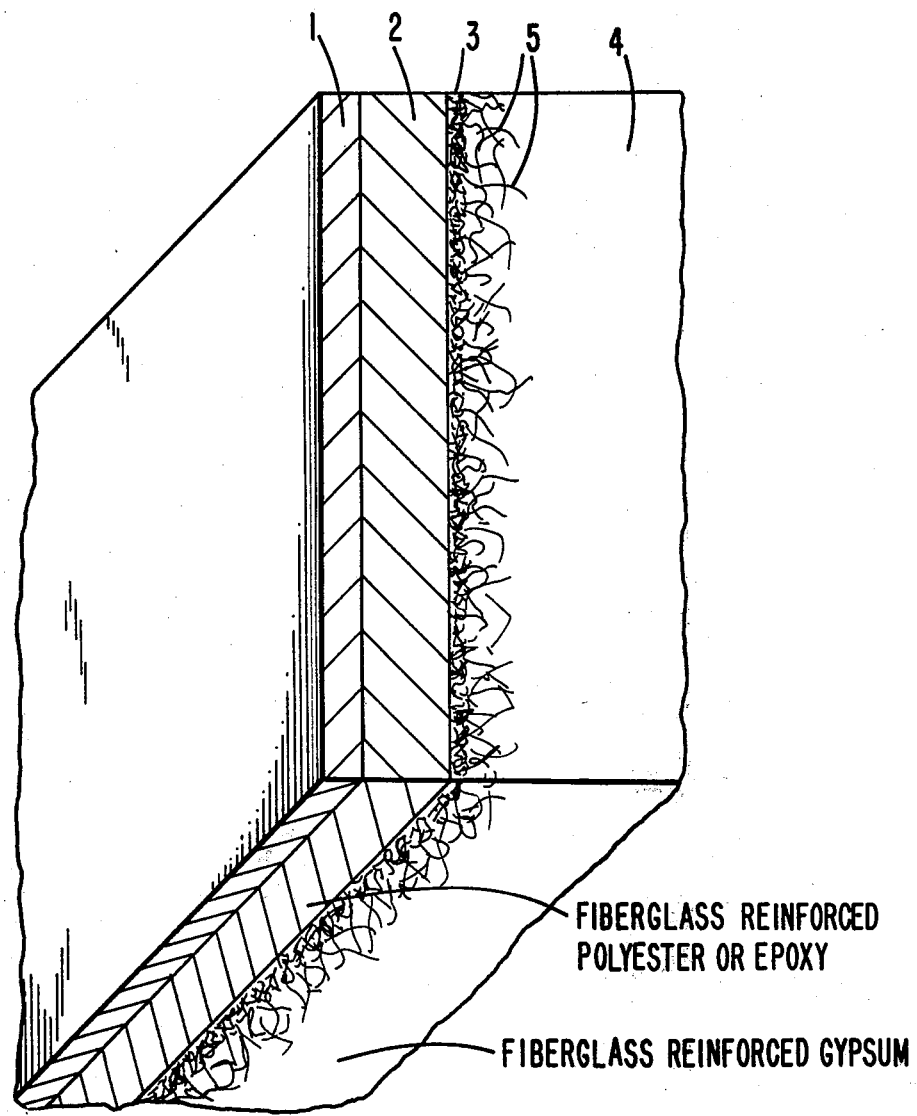

Throughout, reference numerals relate to the drawing.

1. The Plastic Surface Finish Coat

"Plastic surface finish coat" 1 may be any of the organic resin gel coat materials well known to the art, and may include a decorative and/or protective external layer bonded to a structural resin underlayer. Materials which may be used include the well known polyester or epoxy resin gel coats. Whereas it is preferred that the plastic finish coat 1 be a polyester or epoxy resin, acrylic or acrylonitrile-butadiene-styrene (ABS) resins may also be used. When using the acrylic or ABS resins, a previously formed film or sheet of the acrylic or ABS resin is employed as the exterior layer. Thereafter, the polyester resin/glass fiber reinforcing layer, the bonding layer of glass fibers and polyester mist coat, and the glass reinforced gypsum composition are applied to the acrylic or ABS film as hereinafter described.

The thickness of the plastic surface finish coat 1 is not critical. Generally, the plastic finish coat 1 may range from about 15 to about 25 mils in thickness with about 20 mils being presently preferred.

Materials conventionally employed in the gel coat art as adjuvants may be present. These include materials such as pigments, fillers, extenders, stabilizers, plasticizers or other additives.

2. The Reinforcing Layer

Reinforcing layer 2 is bonded to plastic surface finish coat 1 and consists of a castable organic resin capable of curing at room temperature. This layer is reinforced with fibers, preferably glass fibers, in an amount ranging from about 20% to 30% by weight. The cured thickness of the reinforcing layer generally will range from about 20 to about 125 mils with a thickness of 30 to 50 mils being presently preferred. The preferred organic resin comprises either a polyester or epoxy resin, depending upon the composition of plastic finish coat 1. Where the plastic finish coat 1 comprises polyester, acrylic, or ABS resins, the reinforcing layer 2 preferably comprises a polyester resin. Where the plastic finish coat 1 comprises an epoxy resin, however, the reinforcing layer preferably comprises an epoxy resin. The organic resin is catalyzed sufficiently to permit gelling within a reasonable time, for example 10 to 60 minutes, followed by a complete curing of the resin. The preferrred production technique employs room temperature gelling, however, the gelling or curing operation may be carried out at elevated temperatures.

Where reinforcing layer 2 is a polyester resin, it typically comprises polyesters of ethylenically unsaturated polycarboxylic acids, or anhydrides, with polyhydric alcohols, and co-polymerizable ethylenically unsaturated compounds. Optionally, a saturated polycarboxylic acid may be used in combination with the unsaturated acid or anhydride.

Polycarboxylic unsaturated acids useful in preparing the polyester resin include such acids as maleic, fumaric, mesaconic, citraconic, itaconic, and halo and alkyl derivatives of such acids and the like. The ethylenically unsaturated acids are conventionally employed in amounts from 10 to 100 mole percent, preferably 20 to 80 mole percent, of the total acid content of the polyester.

Useful saturated polycarboxylic acids include acids having only aromatic unsaturation as well as acids having fully saturated carbon-carbon linkages. These include such saturated dicarboxylic acids as: malonic, succinic, glutaric, adipic, pimelic, suberic, azelaic and sebacic, and aromatic dicarboxylic acids such as phthalic, isophthalic, terphthalic, tetrachlorophthalic, and the like.

The corresponding anhydrides of the above-listed saturated and unsaturated polycarboxylic acids are, of course, equally useful in the preparation of the polyester resins and yield polyesters which have essentially the same properties as those made with the acids. The term "saturated polycarboxylic acids" is, throughout this disclosure, intended to include aromatic polycarboxylic acids and non-olefinically unsaturated polycarboxylic acids.

The polyhydric alcohols useful in preparing the polyesters include: ethylene glycol, diethylene glycol, triethylene glycol, polyethylene glycol, propylene glycol, polypropylene glycol, glycerol, neopentyl glycol, pentaerythritol, trimethylol propane, trimethylol ethane, and the like. The preferred polyols have a molecular weight of less than about 2000. Typically, they are employed in an equimolar ratio to the total acid content or a slight excess, as much as about 5 mole percent.

Polymerizable ethylenically unsaturated compounds useful in preparing the reinforcing layer compositions are those which crosslink with the unsaturated polyesters to form thermosetting materials. These include such monomers as: styrene, alpha-methyl styrene, divinyl benzene, vinyl acetate, allyl acetate, diallyl phthalate, diallyl succinate, diallyl adipate, diallyl sebacate, diallyl itaconate, diallyl maleate, diallyl fumarate, triallyl cyanurate, methyl acrylate, methyl methacrylate, hexyl acrylate, octyl acrylate, octyl methacrylate, and the like. The preferred monomers are liquid compounds soluble in the polyester components. Such monomers should preferably be free of non-aromatic conjugated double bonds. The amount of monomer employed in the composition is not critical but is usually sufficient to provide a liquid, flowable, interpolymerizable mixture. Ordinarily, the percentage of monomer will be between about 10 percent to about 60 percent of the total weight of the polyester and monomer.

The polyester composition may contain, if required, known inhibitors to prevent premature crosslinking or gelatin. Known inhibitors include quinonic or phenolic compounds, copper compounds or hydroxylamine derivatives and the like. Specific examples of useful inhibitors are: p-benzoquinone, 2,5-di-tert-butyl-quinone, hydroquinone, tert-butyl pyrocatechol, 3-isopropyl catechol, and chloranil.

Catalysts and promoters may be introduced into the polyester resin, usually at the time of application, to facilitate the cure. Catalysts include free radical producing compounds such as peroxides, hydroperoxides, peresters and diacylperoxides and azo nitriles. Benzoyl peroxide, methyl-ethyl ketone peroxide, lauroyl peroxide, cumene peroxide, tert-butyl benzoate, and 2,2 azobis isobutyronitrile are also examples of useful materials.

Promoters, usually used in combination with the catalyst, include cobalt naphthenate, dimethyl aniline, diethyl aniline, cobalt metal dispersions, vanadium pentoxide/phosphate solutions, manganese compounds, tertiary amines, and quaternary ammonium salts.

Where reinforcing layer 2 is based on an epoxy resin, the compositions employed are typically undiluted liquid resins which are conventionally two-component systems, i.e. the resin and catalyst or curing agent are separately packaged and admixed at the time of use.

Epoxy resins which may be used in these compositions include, for example, polyglycidyl esters, such as those obtainable by the reaction of di- or polycarboxylic acid with epichlorohydrin or glycerol dichlorohydrin in the presence of an alkali. Such polyglycidyl esters may be derived from aliphatic dicarboxylic acids, e.g., oxalic acid, succinic acid, glutaric acid, adipic acid, pimelic acid, suberic acid, azelaic acid, sebacic acid, or dimerised or trimerised linoleic acid, but are preferably derived from aromatic dicarboxylic acids such as phthalic acid, isophthalic acid, terphthalic acid, naphthalene-2,6-dicarboxylic acid, diphenyl-o,o'-dicarboxylic acid and ethylene glycol bis(p-carboxyphenyl)ether. Such specific polyglycidyl esters, are for example, diglycidyl phthalate, diglycidyl adipate and those diglycidyl esters which correspond to the average formula:

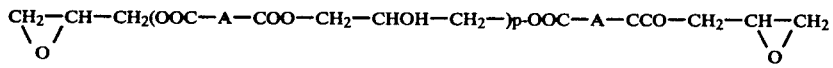

in which A represents a divalent aromatic hydrocarbon radical, such as a phenylene group, and p represents a small, whole or fractional number.

Other epoxy resins which may be used include polyglycidyl ethers such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be drived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-acryldialkanolamines such as N-phenyldiethanolamine, or preferably, from dihydric or polyhydric phenols such as resorcinol, catechol, hydroquinone, 1,4-dihydroxynaphthalene, 1,5-dihydroxynaphthalene, bis(4-hydroxyphenyl)methane, bis(4-hydroxyphenyl)methylphenylmethane, bis(4-hydroxyphenyl)tolylmethane, bis(4-hydroxyphenyl)sulphone and especially, 2,2-bis(4-hydroxyphenyl)propane or phenolformaldehyde condensation products.

There may further be employed aminopolyepoxides such as are, for example, obtained by the dehydrohalogenation of the reaction products of epihalohydrins and primary or secondary amines such as aniline, n-butylamine or bis(4-methylaminophenyl)methane, and products obtained by the partial or complete epoxidation of cyclic or acyclic polyolefins.

As curing agents to be used in the epoxy resin compounds there may be mentioned these conventionally employed as cross-linking agents for epoxy resins, for example amines containing at least two hydrogen atoms directly attached to nitrogen, e.g., aliphatic and aromatic primary and secondary amines such as mono- and di-butylamine, p-phenylenediamine, bis(p-aminophenyl)methane, ethylene-diamine, N,N-diethylenediamine, diethylenetriamine, tetra(hydroxyethyl)-diethylenetriamine, triethylenetetramine, tetraethylenepentamine, piperidene, guanidine, and guanidine derivatives, such as phenylguanidine and diphenylguanidine, dicyanodiamide, polymers of aminostyrenes, and polyamino-amides, e.g., those prepared from aliphatic polyamines and dimerised and trimerised unsaturated fatty acids, isocyanates and isothiocyanates; polyhydric phenols, e.g. resorcinol, hydroquinone, 2,-bis(4-hydroxyphenyl)propane, phenol-aldehyde resins and oil-modified phenol-aldehyde resins; reaction products of aluminum alkoxides or phenolates with tautomeric-reacting compounds of the acetoacetic ester type; Friedel-Crafts catalysts, e.g., $AlCl_3$, $SnCl_4$, $ZnCl_2$, $BF_3$, and their complexes with organic compounds; phosphoric acid; and polycarboxylic acids and their anhydrides e.g., phthalic anhydride, methylenedimethylene-tetrahydrophthalic anhydride, dodecenylsuccinic anhydride, hexahydrophthalic anhydride, hexachloroendomethylene-tetrahydrophthalic anhydrides or endomethylenetetrahydrophthalic anhydrides, or their mixtures, or maleic or succinic anhydrides.

There may also be used catalytic hardeners, e.g. tertiary amines such as 2,4,6,-tris(dimethylaminomethyl)-phenol, triethanolamines, or N-benzyldimethylamines; alkali metal alkoxides of alcohols such as 2,4-dihydroxy-3-hydroxymethylpentane; stannous salts of alkanoic acids, such as stannous octoate; and aluminum alkoxides.

Other classes of castable organic resins such as polyurethanes or polyamide-imide resins or the like may also be useful as reinforcing layer resins.

The reinforcing layer resin compositions can contain pigments, fillers, extenders, plasticizers or similar adjuvants conventionally employed in fiber reinforced structural compositions.

The preferred reinforcing fiber for the practice of this invention is chopped glass roving. However, glass strand mat may also be used. Glass fiber lengths may range from about ¼ inch to about 1 inch with ½ inch lengths being preferred.

Other classes of reinforcing fiber may be used including inorganic fibers such as carbon, boron, alumina, asbestos and mineral wool. Organic fibers may also be used. Examples are polyester, polyamide, and cellulosic type fibers.

The Bonding Layer

Bonding layer 3 comprises glass fibers which are bonded to reinforcing layer 2 and which protrude in random directions from the reinforcing layer 2. The fibers are coated with a controlled amount of organic resin. The organic resin may conveniently be, but need not be, the same resin employed in reinforcing layer 2. The amount of organic resin applied to the fibers of the bonding layer is sufficient to promote adhesion of the fibers to one another at their intersections and adhesion of the fibers to reinforcing layer 2, but insufficient to encapsulate the fibers so as to prevent the subsequently applied gypsum layer from intimately surrounding and engaging a substantial portion of the individual coated fibers on the surface of the bonding layer.

One of the critical factors in achieving a satisfactory laminate product is the amount of glass fibers per unit area (surface density) in the interface of the bonding layer 3 with the gypsum layer 4. It is preferred that the glass fibers of the bonding layer 3 be chopped glass roving applied in amounts ranging from 0.25 to 0.65 ounces per square foot of reinforcing layer surface area. Surface densities below 0.25 ounces per square foot and above 0.65 ounces per square foot do not provide good bonding strength between the gypsum layer 4 and the glass fibers of the bonding layer 3. It is preferred that the bond strength between these layers be at least about 150 psi as determined by ASTM C297-68. The organic resin used to coat fibers of bonding layer 3 is, preferably, a curable polyester or epoxy resin and may conveniently be the same resin used in reinforcing layer 2. The type of resin used in bonding layer 3 will depend upon the resin used in the reinforcing layer 2; i.e. polyester where the reinforcing layer 2 is polyester, and epoxy where the reinforcing layer 2 is opoxy.

The glass fibers of bonding layer 3 preferably range in length from ¼ to 1 inch with about ½ inch lengths being presently preferred.

The Gypsum Layer

Gypsum layer 4 comprises hydrated calcined gypsum or hydrated calcium sulfate hemihydrate, commonly known as plaster of paris in the hydrated state. It may range in thickness from about ⅛ inch to 1 inch although this parameter is not critical and the layer may be thicker or thinner if desired. Gypsum layer 4 is reinforced with chopped fibers, preferably glass fibers of either chopped roving or chopped strand mat, ranging from about ½ to 4 inches in length with 1 inch being generally preferred. The glass fiber content of the gypsum may range from about 0.5 percent to 20 percent of the composition by weight, depending upon the consistency of the plaster.

"Consistency" may be defined as the pounds of water per 100 pounds of calcined gypsum (plaster). A "low consistency" composition may contain 24 to 32 pounds of water per 100 pounds of plaster, and in these compositions a lower fiber content (0.5–7%) is used. A "moderate consistency" employes from 32 to 50 pounds of water per 100 pounds of plaster, and a higher fiber content (7–10%) may be used. A "high consistency" composition uses from 50 to 90 pounds of water per 100 pounds of plaster, and the fiber content may range up to about 20% by weight.

The protruding glass fibers of bonding layer 3 are intimately surrounded by the reinforced gypsum layer providing an extremely strong, adherent bond between the inorganic and organic layers.

Throughout the laminate, while the reinforcing fibers are glass the fiber diameter may range from 36 to 48 microns or from type "G" to type "K". It is generally preferred that the glass fibers used in the practice of the present invention be coated with coupling or sizing agents conventionally used to promote bonding of glass fibers to organic resins. Bonding agents which may be employed include conventional formulations such as epoxy resins, silane or siloxane resins and other compositions such as methacrylic acid/chromium complex silane resins.

Additional layers may be applied to the gypsum layer as desired. For example, the gypsum may be coated to improve its appearance or to provide additional protection from moisture or to seal any protruding glass fiber ends.

The Process

With reference to FIG. 1, plastic surface finish coat 1 may be applied in a suitable mold (not pictured). Where the plastic finish coat 1 is a liquid it will be applied in any conventional manner desired, e.g., spraying or brushing, with spraying being preferred. Where plastic finish coat 1 is a previously formed film or sheet of acrylic or ABS resin it will simply be positioned in the mold and subsequent layers applied as described below.

Plastic finish coat 1, when applied as a liquid, is permitted to at least partially cure before reinforcing layer 2 is applied. Preferably, the reinforcing fiber and the organic resin of reinforcing layer 2 are sprayed simultaneously, in coverging streams, onto the plastic finish coat. Alternatively, the resin and fiber are applied intermittently to form the reinforcing layer. Conventional commercially available spray equipment may be used, capable of applying resin, catalyst, and chopped fiber in converging streams or independently permitting simultaneous or intermittent application of the resin and reinforcing fiber. After the reinforcing layer 2 is applied, and while it is still fluid, it is essential that it be rolled or brushed to remove the trapped air and densify the layer.

The glass fibers of bonding layer 3 are dry sprayed onto the reinforcing layer while it is still tacky, i.e. while the reinforcing layer is still fluid enough to permit the ends of the fibers of the bonding layer to partially embed themselves in the resin of the reinforcing layer 2. The protruding glass fibers of bonding layer 3 are then coated with the curable organic resin by "misting", i.e. the organic resin is applied in a fine, brief spray in an amount sufficient to bond the fibers to one another and to the reinforcing layer 2, but not so much as to cover the fibers and prevent the gypsum layer from surrounding them.

Bonding layer 3 and reinforcing layer 2 are then permitted to cure at room temperature for 10 to 60 minutes, depending upon the type and amount of catalyst used, to at least a gelled state before applying gypsum layer 4. The preferred production technique employs room temperature gelling, however, the gelling or curing operation may be carried out at elevated temperatures.

Gypsum layer 4 is applied by spraying or casting. Spraying is preferred but other methods may be used where desired. The gypsum and other layers are then permitted to harden sufficiently to be removed from the mold.

The mold employed may be made of any conventional materials such as metal, plastic or wood. Parting agents such as silicone lubricants will typically be applied to the mold to assist in removing the laminate products.

Subsequent layers may be applied in any manner that suits the material chosen, such as spraying, brushing, rolling or casting.

EXAMPLE 1

The article mold is cleaned and coated with a polyvinyl alcohol mold release agent. The plastic finish coat is applied to the surface of the mold using a spray gun to spray a catalyzed polyester gel composition. Methyl ethyl ketone peroxide is used as the catalyst at an amount of 1% by weight of the polyester gel composition. The mold is coated with a uniform polyester gel film of about 20 mils in the wet stage. The polyester gel coat is allowed to cure through the exothermic stage prior to applying the next layer of polyester resin.

The reinforcing layer of glass fiber reinforced all purpose polyester is applied to the polyester gel coat by the spray up method using an airless spray system equipped with a catalyzer and a glass chopper. The glass content in the reinforcing layer is about 20% by weight of the all purpose polyester/glass fiber composition. The glass fiber roving is chopped to about 0.5 inch lengths. Methyl ethyl ketone peroxide is again used as the catalyst at a level of about 1% by weight of all purpose polyester. The thickness of the reinforcing layer is about 30 mils. After the reinforcing layer is applied, the all purpose polyester/glass fiber composition is densified by rolling to ensure that all entrapped air is removed.

While the reinforcing layer is still wet and tacky, a layer of dry glass fibers, about 0.5 inches long, is spray applied to the reinforcing layer using a glass chopper to cut the fiber roving at a rate of about 1.5 lbs./minute. The amount of glass fibers per unit area is about 0.5 oz./ft.$^2$, approximately enough to cover the surface with a single layer of fibers. These glass fibers are not compressed into the polyester matrix and are allowed to protrude from the polyester surface. Thereafter, a light mist of the all purpose polyester and MEK peroxide catalyst are sprayed over the surface of the glass fibers without saturating them. The polyester resin is then allowed to gel at room temperature.

A structural base of glass reinforced gypsum is applied to the polyester laminate. The plaster formulation is used in combination with 1 inch glass fibers. Hot water (120°–135° F.) is used to mix the plaster (HYDROCAL PLW plaster) at a consistency of about 65 lbs. of water to 100 lbs. of plaster. The mixing procedure for batch production involves soaking the plaster in the mixng water for 2 minutes and then mixing the wetted plaster with a high shear mixer for 4 minutes. The spray up equipment used to apply the glass reinforced gypsum is calibrated to yield a glass content of about 10% by weight of the dried gypsum/glass fiber composition.

A neat coat of the plaster (containing no glass fibers) is sprayed onto the glass fibers protruding from the polyester surface. Then, the glass chopper is activated and a layer of glass reinforced plaster is spray applied. The total thickness of the glass reinforced gypsum layer is about 0.25 inches.

After the gypsum has set and dried, the laminate is removed from the mold and is placed in an air circulating dryer set at 110°–120° F. to complete the drying.

EXAMPLE 2

An acrylic sheet which has been vacuum formed or thermally shaped into an acrylic shell is made into a laminate product having a glass reinforced gypsum structural base. The interior surface of the acrylic shell is cleaned to ensure that the surface is free of oil, grease and mold release agent. A reinforcing layer of glass reinforced all purpose polyester is spray applied to the interior surface of the acrylic shell. This is done by the spray up method using an airless system equipped with a catalyzer and a glass chopper. Methyl ethyl ketone peroxide is used as the catalyst at a level of about 1.5% by weight of the polyester composition. The glass fiber roving is chopped to about 1 inch lengths and is incorporated into the polyester at a content of about 15% by weight of the polyester resin/glass fiber composite. The polyester reinforcing layer has a thickness of about 40 mils. After the spray application is completed, the glass fiber reinforced polyester layer is densified by using a brush to ensure that all entrapped air is removed.

While the polyester resin in the reinforcing layer is still tacky, a layer of dry glass fibers about 0.5 inches in length is applied thereto using a glass chopper. The amount of glass fiber per unit of surface area is about 0.25 oz./ft.$^2$. The glass chopper is calibrated to cut the roving at a rate of about 1.25 lbs./minute. The glass fibers are spray applied in such a manner that many of the fibers protrude from the polyester resin surface. These protruding fibers are then coated with a light mist of the catalyzed all purpose polyester without saturating them. The polyester coating is then allowed to get at room temperature.

A structural base of glass reinforced gypsum is applied to the surface having the protruding glass fibers. The plaster formulation is prepared as described in Example 1, with the exception of the spray up equipment which is calibrated to yield a glass content of about 12% by weight of the dried gypsum/glass fiber composition.

A neat coat of the plaster (HYDROCAL PLW plaster) containing no glass fibers is sprayed onto the glass fibers protruding from the polyester surface. Then, the glass chopper is turned on and a layer of glass fiber reinforced plaster is spray applied. The total thickness of the glass reinforced gypsum layer is about 0.5 inches. The gypsum is allowed to set and dry at room temperature, afterwhich, the laminate is placed in an air circulating dryer set at about 120° F. to complete the drying.

EXAMPLE 3

A polyester gel coat/glass reinforced gypsum laminate was made in accordance with the procedure described in Example 1. The glass fibers in the bonding layer had a length of 0.5 inches and the bonding fibers were applied in varying surface densities. The bond strength was tested flatwise in tension using 2 inch×2 inch square samples according to ASTM C297-68. The results are shown below:

| Surface Density | Bond Strength | Location of Failure |
| --- | --- | --- |
| 0.25 oz./ft.$^2$ | 148 psi | In gypsum layer |
| 0.5 oz./ft.$^2$ | 289 psi | Bonding Layer/Gypsum Layer Interface |
| 0.75 oz./ft.$^2$ | 36 psi | Bonding Layer/Gypsum Layer Interface |

In the sample having the 0.25 oz./ft.$^2$ surface density, the failure occurred in the gypsum, and therefore, the real bond strength is higher than 148 psi. Quite unexpectedly, the sample having the 0.75 oz./ft.$^2$ surface density had a sharp reduction in bond strength. Since it is preferred that the bond strength be at least 150 psi, the sample having the 0.75 oz./ft.$^2$ surface density was unacceptable.

Having completely described this invention, what is claimed is:

1. A structural laminate comprising:
    (a) a plastic surface finish coat bonded to
    (b) a reinforcing layer of an organic resin selected from polyester resins and epoxy resins containing reinforcing fibers, adhered to
    (c) a bonding layer of organic resin coated glass fibers which are bonded to the reinforcing layer and which protrude therefrom, said glass fibers being present in an amount sufficient to provide a surface density of 0.25 to 0.65 ounces per square foot of reinforcing layer surface area, said protruding glass fibers being coated with an amount of the organic resin sufficient to promote adhesion of the fibers to one another at their intersections, but insufficient to encapsulate the fibers so as to prevent the gypsum layer (d) from intimately surrounding and engaging a substantial portion of the individual protruding coated fibers, said coated glass fibers being engaged and surrounded by
    (d) a gypsum layer reinforced with glass fibers which functions as the structural base, and said structural laminate is characterized by having a bond strength between the gypsum layer and the plastic layer with which it interfaces of at least about 150 psi as determined by ASTM C297-68.

2. A structural laminate in accordance with claim 1 in which the plastic surface finish coat is selected from the group consisting of polyester resins, acrylic resins and acrylonitrile-butadiene-styrene resins and the reinforcing layer comprises a polyester resin.

3. A structural laminate in accordance with claim 1 in which the plastic surface finish coat is an epoxy resin, the reinforcing layer comprises an epoxy resin and the glass fibers comprising the bonding layer are mist coated with a polyester resin.

4. A structural laminate in accordance with claim 2 in which the glass fibers comprising the bonding layer are mist coated with a polyester resin.

5. A structural laminate in accordance with claim 1 in which the reinforcing fibers in the reinforcing layer are selected from chopped glass roving, glass strand mat, inorganic fibers and organic fibers.

6. A process for making a structural laminate comprising:
    (a) applying a curable plastic finish coat containing a catalyst therefor to the surface of a mold;
    (b) partially curing said curable plastic finish coat;
    (c) applying a reinforcing layer of organic resin containing reinforcing fibers to said partially cured plastic finish coat by spraying said organic resin and reinforcing fibers onto said plastic finish coat;
    (d) densifying said reinforcing layer to remove entrapped air;
    (e) while said reinforcing layer is tacky, applying a bonding layer of chopped glass fibers by dry spraying said glass fibers onto said reinforcing layer in such a manner that said glass fibers protrude from said reinforcing layer;
    (f) applying a light mist organic resin coating by spraying a limited amount of catalyzed resin over the surface of the protruding glass fibers;
    (g) allowing the organic resin coating on the protruding glass fibers and the organic resin of the reinforcing layer to cure to at least the gel state;
    (h) applying a neat coat of plaster containing no glass fibers by spraying the plaster onto the protruding glass fibers;
    (i) applying a layer of glass reinforced plaster onto the protruding fibers by simultaneously spraying the plaster and operating a glass chopper to supply a stream of chopped glass fibers into the wet plaster; and (j) drying the plaster to form a hard gypsum structural base.

7. A process in accordance with claim 6 in which the curable plastic finish coat is a polyester resin, the organic resin of the reinforcing layer and the organic resin applied to the protruding glass fibers are both polyester resins, and the chopped glass fibers comprising the bonding layer are present in an amount to provide surface density of 0.65 ounces per square foot of reinforcing layer surface area.

8. A process in accordance with claim 6 in which the curable plastic finish coat is an epoxy resin, the organic resin of the reinforcing layer and the organic resin applied to the protruding glass fibers are both epoxy resins, and the chopped glass fibers comprising the bonding layer are present in an amount to provide a surface density of 0.25 to 0.65 ounces per square foot of reinforcing layer surface area.

9. A process for making a structural laminate comprising (a) applying a reinforcing layer of polyester resin containing reinforcing fibers to a shell material selected from an acrylic resin and an acrylonitrile-butadiene-styrene resin by spraying said polyester resin and reinforcing fibers onto the interior surface of said shell material;

(b) densifying said reinforcing layer to remove entrapped air;

(c) while said reinforcing layer is tacky, applying a bonding layer of chopped glass fibers by dry spraying said glass fibers onto said reinforcing layer in such a manner that said glass fibers protrude from said reinforcing layer;

(d) applying a light mist of polyester resin coating by spraying a limited amount of catalyzed polyester resin over the surface of the protruding glass fibers;

(e) allowing the polyester resin coating on the protruding glass fibers and the polyester resin of the reinforcing layer to cure to at least the gel state;

(f) applying a neat coat of plaster containing no glass fibers by spraying the plaster onto the protruding glass fibers;

(g) applying a layer of glass reinforced plaster onto the protruding fibers by simultaneously spraying the plaster and operating a glass chopper to supply a stream of chopped glass fibers into the wet plaster; and (h) drying the plaster to form a hard gypsum structural base.

10. A process in accordance with claim 9 in which the chopped glass fibers comprising the bonding layer are present in an amount to provide a surface density of 0.25 to 0.65 ounces per square foot of reinforcing layer surface.

* * * * *